United States Patent Office 3,642,896
Patented Feb. 15, 1972

3,642,896
PROCESS FOR THE PREPARATION OF $\alpha^1$-TERTIARY BUTYLAMINOMETHYL - 4 - HYDROXY-m-XYLENE-$\alpha^1,\alpha^3$-DIOL
David Trevor Collin, London, England, assignor to Allen & Hanburys Limited, London, England
No Drawing. Filed Apr. 15, 1968, Ser. No. 721,214
Claims priority, application Great Britain, Apr. 21, 1967, 18,383/67
Int. Cl. C07c 85/02
U.S. Cl. 260—570.6
3 Claims

ABSTRACT OF THE DISCLOSURE

A multi-stage process for the preparation of compounds of the general formula:

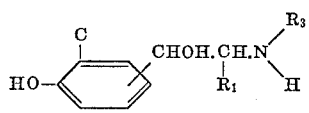

is disclosed from the parent ketone of the formula

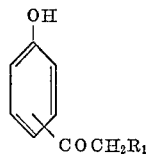

by steps including chloromethylation, acetylation, bromination, amination with a compound of the formula

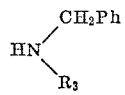

deacetylation and reduction. The product may be isolated as a pharmaceutically acceptable salt.

---

This invention relates to phenyl-2-aminoethanol derivatives and is concerned with developments of the invention described in application Ser. No. 669,263 of Lawrence H. C. Lunts et al. assigned to a common assignee.

The compounds of application Ser. No. 669,263 are represented by the general formula

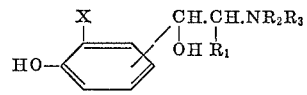

and physiologically acceptable acid addition salts thereof, in which:

$R_1$ represents a hydrogen atom or a straight or branched chain alkyl radical containing from 1 to 6 carbon atoms;

$R_2$ represents a hydrogen atom, or a benzyl group;

$R_3$ represents a hydrogen atom, or a straight or branched chain alkyl radical containing from 1 to 6 carbon atoms which radical may be substituted by hydroxyl groups, amino groups or heterocyclic rings, containing one or more heteroatoms, for example morpholino, or represents a cycloalkyl, aralkyl or aryloxyalkyl radical which radicals may optionally be substituted for example by one or more alkoxy or hydroxy groups; and X represents a hydroxyalkyl or hydroxyaralkyl radical having a straight or branched alkyl chain containing from 1 to 6 carbon atoms, or a carboxyl radical, or an alkoxycarbonyl radical of the formula —COOR$_4$ (where R$_4$ represents a straight or branched chain alkyl radical containing from 1 to 6 carbon atoms), or represents a radical of the formula —CONHOH or —CONHNH$_2$ or an amido radical of the formula —CONR$_5$R$_6$ (where R$_5$ and R$_6$, which may be the same or different, each represent a hydrogen atom or an arylalkyl radical or a straight or branched chain alkyl radical containing from 1 to 6 carbon atoms which may be substituted by hydroxyl or amino groups or where R$_5$ and R$_6$ together with the adjacent nitrogen atom form a heterocyclic ring which may contain additional hetero atoms).

The present invention provides a process for the production of compounds of the general formula

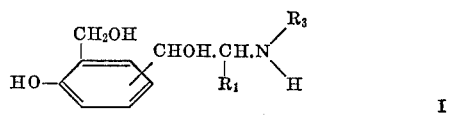

in which $R_1$ and $R_3$ have the meaning given above. Preferably $R_3$ is a hydrogen atom or a straight or branched chain alkyl radical containing from 1 to 6 carbon atoms or a cycloalkyl, aralkyl or aryloxyalkyl radical or a 3-indolylalkyl radical.

The process includes subjecting a compound of the general formula

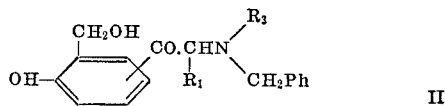

in which $R_1$ and $R_3$ have the meanings given above and Ph is a phenyl radical to catalytic hydrogenation, and includes a process for the production of the keto compound II from aryl ketones of the general Formula III by the following reaction scheme:

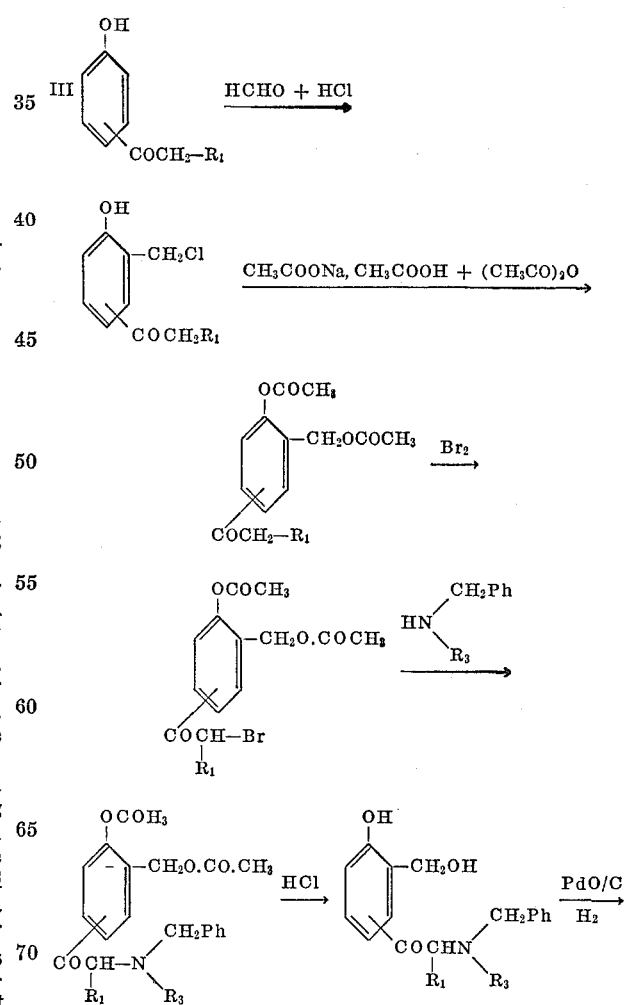

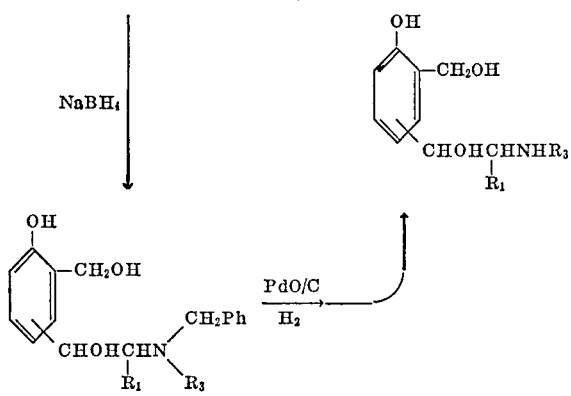

It will therefore be seen that production of compounds of general Formula I involves a multistage process involving the following steps:

(a) chloromethylation
(b) acetylation
(c) bromination
(d) amination
(e) de-acetylation
(f) reduction The product may be isolated as the free diol or in the form of a pharmaceutically acceptable salt thereof, for example the hydrochloride.

In the chloromethylation step one may avoid the use of gaseous hydrogen chloride by using large quantities of concentrated hydrochloric acid as described in the alternative process exemplified below for stage (a) of the example.

The reduction step (f) may be carried out in two stages if desired that is by first reduction using sodium borohydride and a second stage using palladized charcoal, or may be a single stage reduction using palladized charcoal.

The process according to the invention has particular utility for the commercial production of the compounds of Formula I. The pharmacological utility of these compounds is set forth in application Ser. No. 669,263 referred to above.

The following examples illustrates the invention:

α-TERTIARY BUTYLAMINOMETHYL-4-HYDROXY-M-XYLENE-α³-DIOL (a) Preparation of 3-(chloromethyl)-4-hydroxyacetophenone 500 g. of p-hydroxy-acetophenone, 1 litre of formaldehyde solution (40% w./v.) and 2 litres of concentrated hydrochloric acid were stirred and cooled to 20° C. when 320 g. of hydrogen chloride gas was passed into the suspension whilst maintaining the temperature at 20° C. After stirring for a further 2 hrs. the mixture was allowed to stand for 18 hrs. 5 litres of distilled water were then added and the solid was removed by filtration, washed with hot water and hot benzene to give 480 g. of a pale red solid, M.P. 164° C. (Ref. Gazz. Chim., Acta., 81, 773–781. Chem. Ab., 46, 8048 (1952), M.P. 160° C.).

An alternative process for the preparation of this compound, avoiding the use of gaseous hydrogen chloride, was carried out as follows:

3-chloromethyl-4-hydroxyacetophenone.—10 kg. of p-hydroxy-acetophenone were added to a stirred solution of 6.6 litres of 40% w./v. formaldehyde solution and 45 litres of concentrated hydrochloric acid (35–38% w./v.) which had previously been heated to 45–50°. The temperature was maintained at 50° for two hours after which 45 litres of water were added. The red solid which formed was washed with 20 litres of hot water and dried at 60° in air to give 12 kg. of the product as a red solid, M.P. 164°.

(b) Preparation of 3-(hydroxymethyl)-4-hydroxyacetophenone diacetate 470 g. of 3-(chloromethyl)-4-hydroxy-acetophenone, 235 g. of anhydrous sodium acetate, 1100 ml. of glacial acid and 550 ml. of acetic anhydride were stirred and refluxed for 2 hours. The acetic acid was then distilled in vacuo and the residue poured into water. The oil which separated was extracted into chloroform and the chloroform evaporated in vacuo. The residue was distilled to yield 550 g. of a colourless oil, B.P. 150–160° C./0.3 mm. $n_D^{20}=1.517$. This oil solidified to give a white solid, M.P. 50° C.

(c) Preparation of 3-(hydroxymethyl)-4-hydroxy-ω-bromoacetophenone diacetate 555 g. of 3-(hydroxymethyl)-4-hydroxy-acetophenone diacetate and 2 litres of chloroform were stirred and cooled to 20° C. A solution of 118 ml. of bromine dissolved in 400 ml. of chloroform was added over 1 hr., maintaining the temperature at 20° C. After the addition, 3 litres of ice/water was added and the chloroform layer was separated, washed with water and dried over sodium sulphate. The chloroform was evaporated in vacuo to yield 730 g. of a pale yellow oil.

(d) Preparation of 2-(N-benzyl-N-tertiary butylamino)-4′-hydroxy-3′-hydroxymethyl acetophenone hydrochloride 213 g. of 3-(hydroxymethyl)-4-hydroxy-ω-bromoacetophenone diacetate, 220 g. of benzyl-teriary butylamine and 90 ml. of benzene were stirred and heated at reflux for 18 hrs. After cooling the benzyl-tertiary butylamine hydrobromide was removed by filtration and washed with benzene. The benzene solution was extracted with three 200 ml. portions of 2 N hydrochloric acid solution. The aqueous acid solution was then extracted with 500 ml. of ether, concentrated hydrochloric acid (65 ml.) was added and the solution allowed to stand for 18 hrs. The precipitate was removed by filtration and washed with water. Crystallization from water gave 90 g. of the product as a white solid, M.P. 174° C.

(e) Preparation of α¹-tertiary butylaminomethyl-4-hydroxy-m-xylene-α¹,α³ diol 120 g. of 2-(N-benzyl-N-tertiary butylamino)-4′-hydroxy-3′-hydroxymethyl acetophenone hydrochloride was shaken with 500 ml. of 10% sodium carbonate solution and 500 ml. of ethyl acetate. The ethyl acetate layer was separated, washed with water, dried over anhydrous sodium sulphate and evaporated. The residual gum was dissolved in 500 ml. of ethanol and hydrogenated with 10 g. of 10% palladium oxide on charcoal catalyst at 60° C. and at atmospheric pressure. Two moles of hydrogen were absorbed in 3½ hrs. The catalyst was removed by filtration and the ethanol distilled in vacuo. The residual gum was refluxed with 500 ml. of ethyl acetate for a few minutes and then allowed to cool. The white solid was removed by filtration and recrystallised from ethanol/ethyl acetate to yield 30 g. of the diol M.P. 151° C.

I claim:

1. A process for the preparation of $\alpha^1$-tertiary butylaminomethyl-4-hydroxy-m-xylene-$\alpha^1,\alpha^3$ - diol, comprising the steps of (a) reacting p-hydroxy-acetophenone with formaldehyde and hydrochloric acid to produce 3-chloromethyl-4-hydroxy-acetophenone, (b) reacting said last-mentioned compound with a mixture of anhydrous alkali metal acetate, glacial acetic acid and acetic anhydride to produce 3-hydroxymethyl-4-hydroxy-acetophenone diacetate, (c) reacting said last-mentioned compound with bromine to produce 3-hydroxymethyl-4-hydroxy-ω-bromoacetophenone diacetate, (d) reacting said last-mentioned compound with benzyl-tertiary butylamine and hydrolyzing the resulting product in the presence of hydrochloric acid to produce 2-(N-benzyl-N-tertiary butylamino)-4'-hydroxy-3'-hydroxymethyl acetophenone hydrochloride, (e) reacting said last mentioned compound with a base to convert it to the free amine and reacting said free amine with hydrogen or with sodium borohydride followed by reaction with hydrogen to produce said $\alpha^1$-tertiary butylaminomethyl-4-hydroxy-m-xylene-$\alpha^1,\alpha^3$-diol and (f) isolating said last-mentioned compound.

2. A process as claimed in claim 1 in which said reaction with hydrogen is effected with palladized charcoal.

3. A process as claimed in claim 1 in which the latter part of step (e) is effected in two stages by successive reaction with sodium borohydride and with hydrogen with palladized charcoal.

References Cited

UNITED STATES PATENTS

| 1,926,952 | 9/1936 | Legerlotz | 260—570.5 X |
| 2,245,282 | 6/1941 | Legerlotz | 260—570.5 |
| 2,835,669 | 5/1958 | Thomas | 260—570.5 X |
| 3,253,034 | 5/1966 | McLoughlin | 260—570.6 |
| 3,340,305 | 9/1967 | Jakor | 260—570.5 X |
| 3,341,553 | 9/1967 | Ziele | 260—570.6 |

OTHER REFERENCES

Trave, "Chemical Abstracts," vol. 45, pp. 7047–8 (1951).

Trave. "Chemical Abstracts," vol. 46, pp. 8048–49 (1952).

ROBERT V. HINES, Primary Examiner

U.S. Cl. X.R.

260—247.5 R, 326.5 J, 326.5 L, 479 R, 482 R, 483, 570.5 C, 570.9, 592